United States Patent [19]
Yamazaki

[11] Patent Number: 5,853,103
[45] Date of Patent: Dec. 29, 1998

[54] FUEL TANK STRUCTURE

[75] Inventor: Shuichiro Yamazaki, Kanagawa-ken, Japan

[73] Assignee: Nissan Motor Co., LTD., Kanagawa-ken, Japan

[21] Appl. No.: 934,051

[22] Filed: Sep. 19, 1997

[30]     Foreign Application Priority Data

Sep. 20, 1996   [JP]   Japan ..................................... 8-249710

[51] Int. Cl.⁶ ................................................ B65D 90/00
[52] U.S. Cl. ......................................... 220/562; 220/86.2
[58] Field of Search ................... 220/562, 563, 220/86.2

[56]             References Cited
         U.S. PATENT DOCUMENTS

| | | | |
|---|---|---|---|
| 1,341,965 | 6/1920 | Xardell | 220/562 |
| 2,966,919 | 1/1961 | Wood | 220/86.2 X |
| 3,635,182 | 1/1972 | Paffett | 220/563 X |
| 3,645,416 | 2/1972 | Main, Jr. | 220/563 |
| 5,099,880 | 3/1992 | Szlaga et al. | |

*Primary Examiner*—Steven M. Pollard
*Attorney, Agent, or Firm*—McDermott, Will & Emery

[57]           ABSTRACT

A bracket which supports flow control valves within a fuel tank, is provided with impact absorbing portions for absorbing the impact by deformation. The impact absorbing portions include first to fourth bending portions which are disposed in parallel along an impact input direction, which each have a different rigidity and which are connected by supporting portions. Accordingly, an impact force at a time of collision is not directly applied to the valves.

20 Claims, 5 Drawing Sheets

FUEL TANK STRUCTURE

BACKGROUND OF THE INVENTION

1. Field of the Invention

The present invention generally relates to a fuel tank structure used for an automotive vehicle and the like. More particularly, this invention relates to a fuel tank structure which includes a bracket that can prevent damage to valves housed within a tank body due to collision induced deformation thereof.

2. Description of the Related Art

In a conventional automotive fuel tank structure such as disclosed in U.S. Pat. No. 5,099,880, a filler tube is connected to a tank body, and an upper surface of the tank body is provided with an evaporation float valve and a ventilation float valve. The evaporation float valve is connected to a canister through an evaporation tube while the ventilation float valve is connected to the canister through a ventilation tube.

An evaporation check valve is provided in the evaporation tube and a ventilation check valve is provided in the ventilation tube.

The ventilation check valve is separated into a first chamber and a second chamber by a diaphragm. An inlet flow tube and an outlet flow tube which form part of the ventilation tube are connected to the second chamber in such a manner that communication between the inlet flow tube and the outlet flow tube is permitted or cut-off by the opening and closing movements of the diaphragm. Further, a signal tube communicates the first chamber and the filler tube.

In this case, the canister is open to the atmosphere via an opening and further is connected to an engine through a tube.

In the above structure, when fuel flows into the tank through the filler tube during refueling, the vapor generated within the tank during this period is introduced into the canister through the ventilation check valve and the outlet flow tube.

Further, since the evaporation check valve is set to open in response to a pressure higher than that of the ventilation check valve, the evaporation check valve is closed during refueling.

On the contrary, when a pressure within the tank increases above a predetermined value with a filler cap closed, the pressure within the filler tube becomes equal with the pressure within the tank. Accordingly, since the pressure in the first chamber of the ventilation check valve and the pressure in the inlet flow tube of the ventilation tube are the same, the ventilation check valve remains closed.

Further, the arrangement is such that during a closed state of the ventilation check valve, when the pressure within the tank increases to a certain set value, the evaporation check valve is opened so that gas (i.e. gasoline vapor) is introduced into the canister through the evaporation tube.

However, in the above type of fuel tank structure, when an impact, due to an automotive collision, is directly applied to valves such as the ventilation check valve and the like provided on the outer upper surface of the tank, these valves are deformed so that there is a risk that they will malfunction and their respective functions will be impaired and/or lost.

Further, since the ventilation check valve etc., are provided externally of the tank body, they are always exposed to the ambient atmosphere. Accordingly, during production there may be some deviation in the degree with which bolts are tightened and/or some small deformation generated at the valve fastening portion. If such a deformation occurs there is a risk that rust will occur at the site of deformation and that the effect of an impact will be increased.

SUMMARY OF THE INVENTION

An object of the present invention is to provide a fuel tank structure which can prevent an impact such as that resulting from an automotive collision from directly effecting the valves, and which can improve anticorrosive performance.

In order to achieve the above object, in accordance with the present invention, there is provided a fuel tank structure comprising: a tank body to which various pipes are connected; valves which control a flow of a flow medium flowing in an inside of the pipes; and a bracket for supporting the valve within the fuel tank.

The bracket includes a connecting portion connected to an inside of the tank body; a valve mounting portion to which the valve is mounted; and an impact absorbing portion which is disposed between the connecting portion and the valve mounting portion and is deformed by itself so as to absorb the impact when the tank body receives the impact to be deformed.

When the valve is fixed to the inside of the tank body by the bracket, even if an impact force due to a collision or the like is applied, the tank body is at first deformed so as to absorb the impact force. This is then followed by impact absorption by an absorbing portion or portions of the bracket.

Accordingly, it is prevented that the impact force at the collision of the automotive vehicle is directly applied to the valve so that the deformation of the valve is prevented, thereby preventing a deterioration of the valve function. Further, since the valve is disposed within the tank body, is not exposed to the outer air and is prevented from deformation. Additionally, the degree of rust generation is decreased.

In accordance with the present invention, the impact absorbing portion may be formed by a plurality of bent portions which are disposed along an input direction of the impact and respectively extend to a direction cross to the input direction of the impact and the plurality of bent portions may be formed to have a lower rigidity as they become further removed from the valve mounting portion.

In accordance with the above structure, since the plurality of bent portions having different rigidity, are disposed in parallel to the impact absorbing direction, deformation initiates at the bent portion which is most distal from the valve mounting portion.

Accordingly, the amount of deformation close to the valve mounting portion is reduced and the damage due to interference and the like can be maximally prevented.

In accordance with the present invention, the bent portions may be formed such as to respectively extend to a direction substantially perpendicular to the impact input direction and to have a cross-sectional area taken substantially perpendicular to the impact input direction in such a manner that the area becomes small as the distance of the cross section from the valve mounting portion increases. The bracket may additionally have a supporting portion which interconnects the bent portions.

In accordance with the above structure, the bracket can be easily formed from sheet stock (e.g. sheet steel etc.,).

Further, at the time of impact, the bracket is deformed at the bent portions and the supporting portion is hardly deformed. Accordingly, the shape of the bracket after deformation due to the impact becomes substantially constant in correspondence to an initial shape before the impact is input. Therefore, if the initial shape of the bracket is set to a shape having a sufficient space between the supporting portion and the valve mounting portion, interference between the deformed supporting portion and the valve mounting portion can be prevented.

In accordance with the present invention, the supporting portion may be comprised of a main surface portion which interconnects the bent portions and a flange portion which projects to a substantially perpendicular direction from the main surface portion.

In accordance with the above structure, since the supporting portion is structured such as to have the flange portion bent to a substantially perpendicular direction with respect to the main surface portion, the bracket can be easily formed by a press working and the like.

In accordance with the present invention, the bracket may be structured such as to be disposed in an upper portion within the tank body, the impact absorbing portion may be a bent portion which is bent in such a manner wherein the valve mounting portion moves downward within the tank body at a time of receiving the impact, and the valve mounted to the valve mounting portion moves into a space formed after the deformation of the tank body within the tank body at a time of receiving the impact.

In accordance with the above structure, at a time when the impact is input, the valve bent portion is bent and the valve mounting portion moves downward within the tank body so that the valve moves to the space.

Accordingly, the risk that the valve interferes with other parts after the impact is reduced.

In accordance with the present invention, the valve mounting portion may be comprised of a main portion which is formed as a substantially plain plate and is provided with a valve mounting and a reinforcing flange portion which projects from a peripheral edge of the main portion.

In accordance with the above structure, since the supporting portion is structured such as to have the flange portion bent substantially perpendicular to direction with respect to the main surface portion, the bracket can be easily formed by a press forming and the like.

In accordance with the present invention, the bracket may be provided with a deformation prevention flange portion which projects to a direction cross to an extending direction of the bent portion from a position of the bent portion close to the valve mounting portion.

In accordance with the above structure, the supporting portion and the like successively connecting to the position of the bent portion close to the valve mounting portion is hardly bent at an unnecessarily excess degree by the deformation prevention flange portion.

Accordingly, in the position of the bent portion close to the valve mounting portion, the bent deformation amount due to input of the impact can be decreased and a close contact of the supporting portion and the like to the valve mounting portion can be prevented so that interference of the valve to the other parts can be prevented.

In accordance with the present invention, the deformation prevention flange portion may be formed such as to successively connect to the flange portion of the supporting portion and the reinforcing flange portion of the valve mounting portion.

In accordance with the above structure, since the deformation prevention flange portion is provided in such a manner as to be connected to the adjacent flange portion and the reinforcing flange portion, both of the flange portions can be simultaneously formed so that the formation is easily performed.

In accordance with the present invention, the valve mounting portion may be comprised of a main portion which is formed as a substantially plain plate and is mounted to the valve and a bendable portion provided in the main portion such that the main portion is bent along a bending line apart from a position in which the valve is mounted at a time of receiving the impact.

The bendable portion of the valve mounting portion may include an opening formed on the bending line of the main portion.

In accordance with the above structure, in the case that the impact force is transmitted to the valve mounting portion, the valve mounting portion bends and deforms along the bending line so that the impact force can be absorbed.

In accordance with the present invention, the bending line of the valve mounting portion may be set to have a linear shape obliquely crossing the input direction of the impact and two valve mounting portions disposed in an asymmetrical relation with respect to the bending line may be provided in the main portion of the valve mounting portion.

In accordance with the above structure, the valves can be disposed in the asymmetrical positions with respect to the bending line in an efficient manner on space and direct interference between the valves at a time of bending can be prevented.

In accordance with the present invention, the bendable portion of the valve mounting portion may be structured to have a rigidity in which the main portion can be bent along the bending line after the final deformation of the impact absorbing portion.

In accordance with the above structure, after most of the impact force is absorbed due to the deformation of the impact absorbing portion to the final deformation portion, the impact force applied to the valve mounting portion can be absorbed by the bending and deformation of the bendable portion.

Accordingly, the deformation in the valve mounting portion is prevented to the utmost without directly applying the impact force to the valves, and so that rust formation and the like, can be greatly attenuated.

BRIEF DESCRIPTION OF THE DRAWINGS

The various features and attendant advantages of the present invention will become more clearly appreciated from the following description of the preferred embodiments when taken in conjunction with the appended drawings in which.

DETAILED DESCRIPTION OF THE PREFERRED EMBODIMENTS

Figure 1:
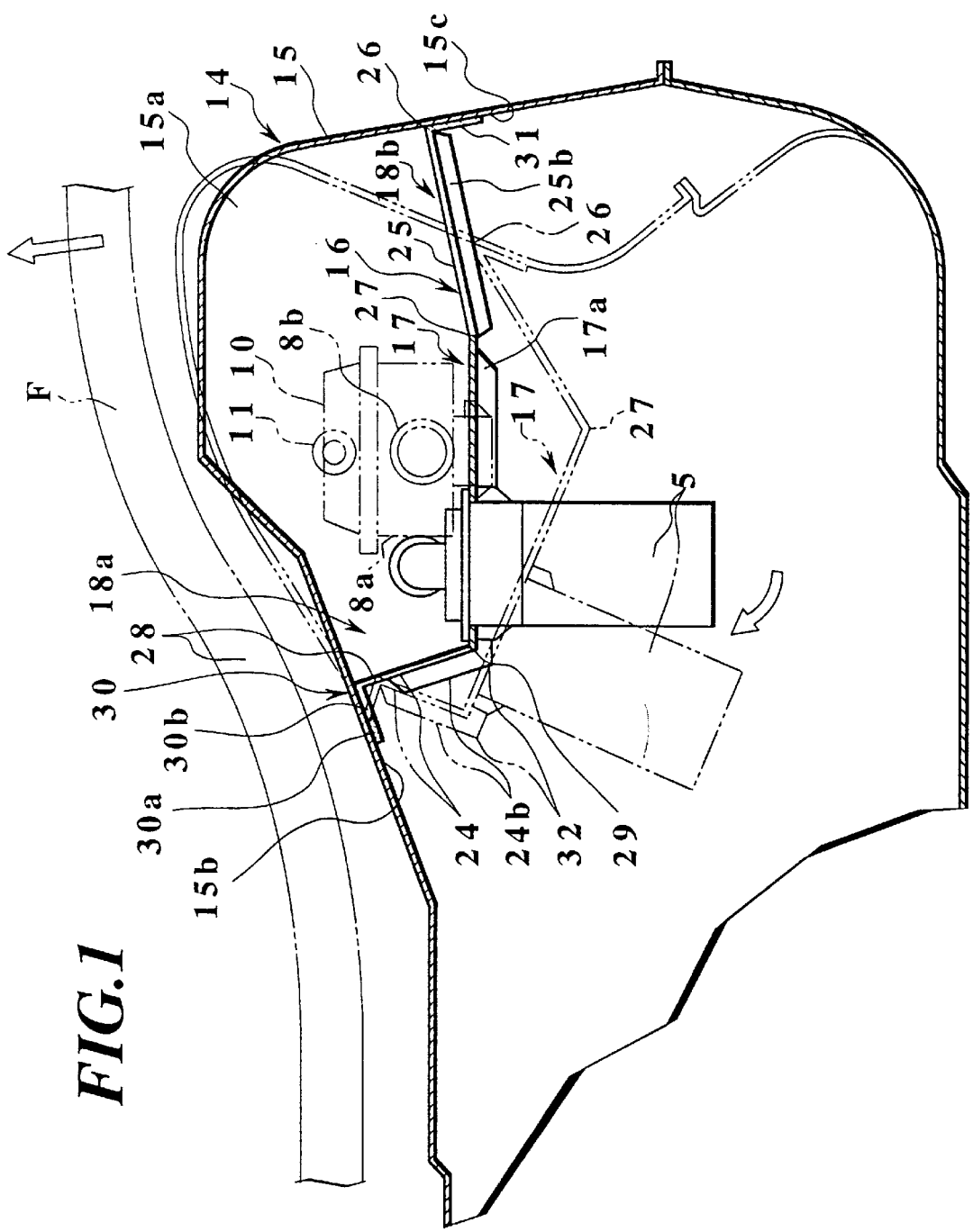
FIG. 1 is a cross-sectional view of a fuel tank structure which shows an embodiment according to the present invention.

FIGS. 1 to 7 show an embodiment of the present invention. In this arrangement a fuel tank 14 for an automotive vehicle comprises a tank body 15 disposed below a frame F arranged at a rear portion of the automotive vehicle. The tank body 15 is connected to a filler tube and various other pipes or conduits which transfer evaporation gas (fuel vapor) and the like.

A ventilation float valve 5 and a ventilation check valve 10 which control the flow of a gas and the like within the various conduits or pipes and as the conduit connection nipples/members as are disposed within the tank body 15.

A bracket 16 (see FIG. 1) supports the ventilation float valve 5 and the ventilation check valve 10 to an upper corner portion 15a of a rear end within the tank body 15. This bracket 16 formed of metal plate and comprises a valve mounting portion 17 to which the ventilation float valve 5 and the ventilation check valve 10 are mounted, and impact absorbing portions 18a and 18b provided at the front and rear of the valve mounting portion 17, for absorbing an impact due to deformation.

The front impact absorbing portion 18a is arranged in a position substantially perpendicular to the valve mounting portion 17. The rear impact absorbing portion 18b, on the other hand, extends slightly upward with respect to the valve mounting portion 17. Accordingly, the bracket 16 is structured such as to have a substantially L-shape as seen in elevation.

Figure 2:
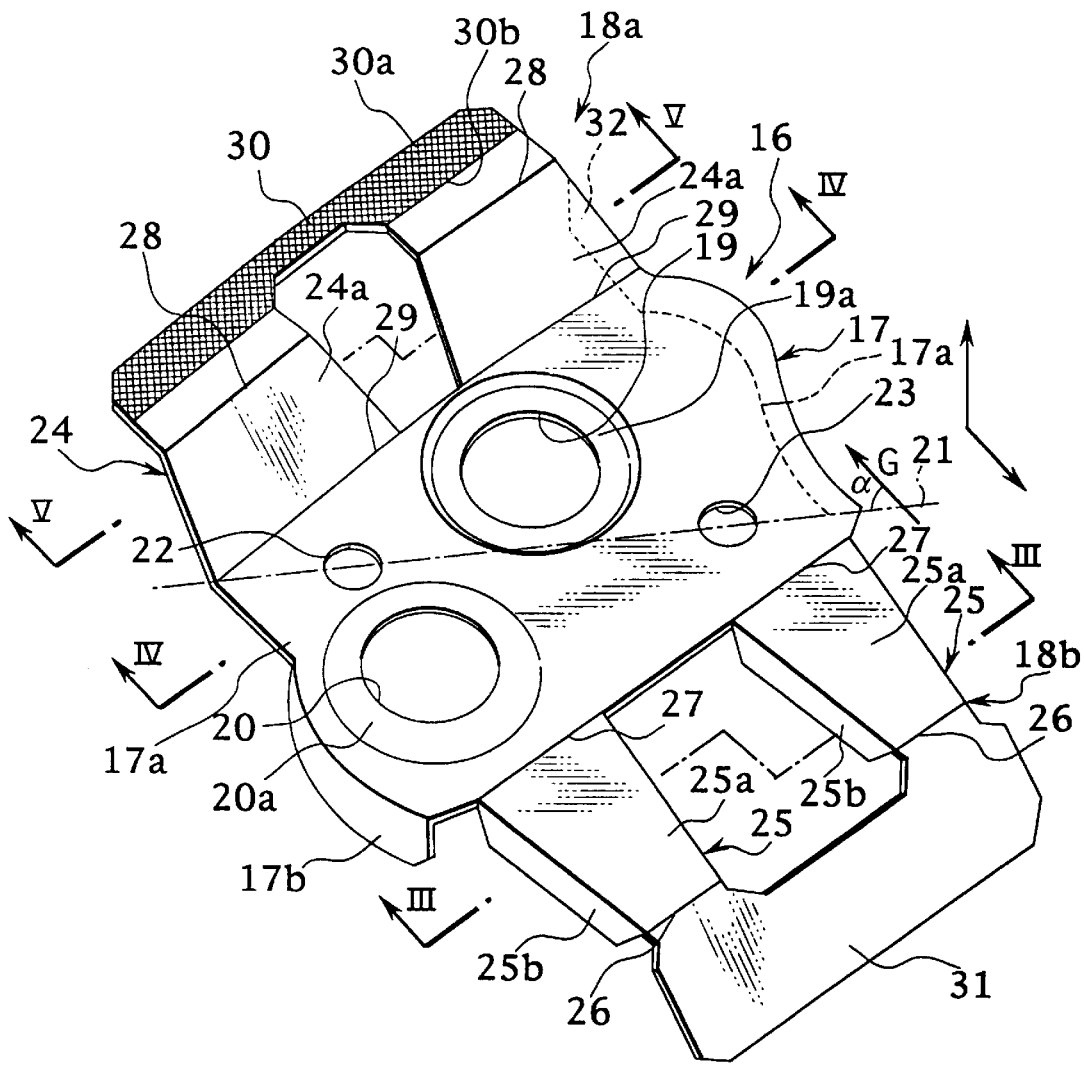
FIG. 2 is a perspective view which shows a bracket used in the fuel tank structure shown in FIG. 1.
Figure 3:
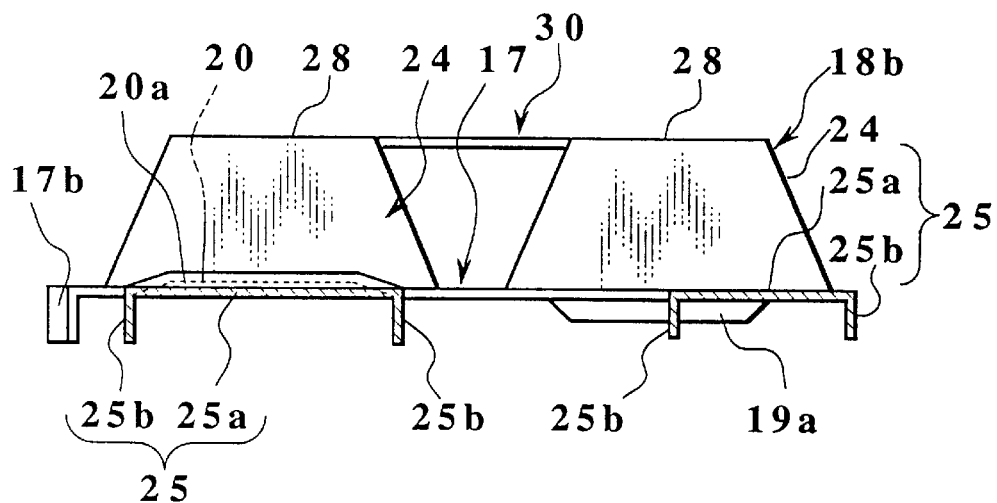
FIG. 3 is a cross-sectional view taken along section line III—III of FIG. 2.
Figure 4:
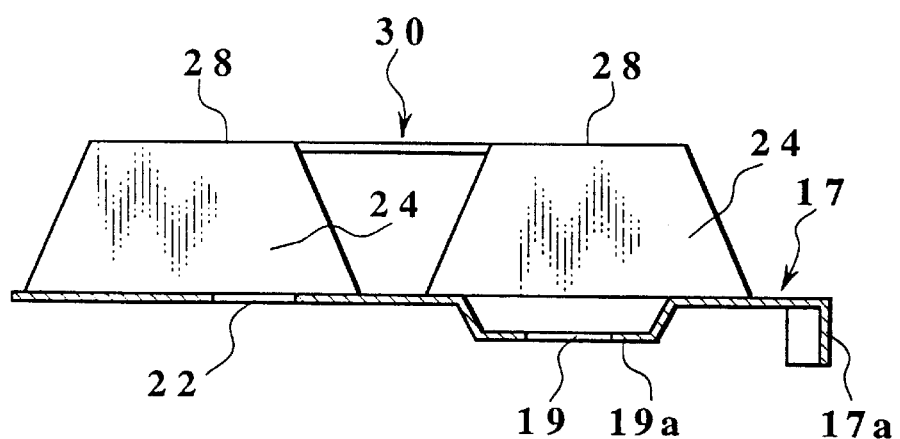
FIG. 4 is a cross-sectional view taken along section line IV—IV of FIG. 2.
Figure 5:
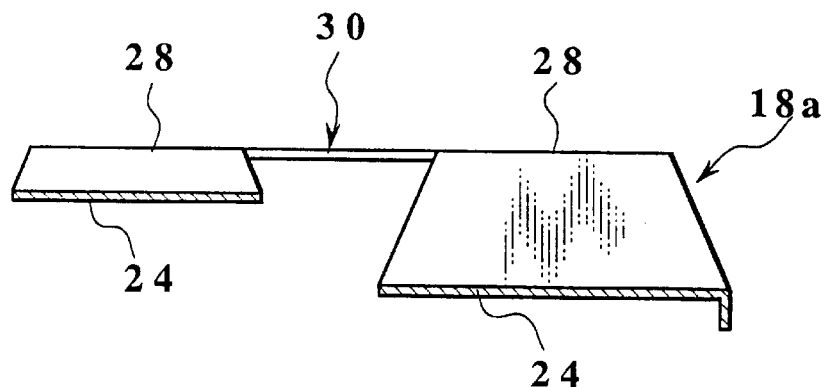
FIG. 5 is a cross-sectional view along taken section line V—V of FIG. 2.

The valve mounting portion 17 includes a main portion 17a which in this embodiment has an essentially rectangular shape and is oriented so that when the fuel tank is installed, its longitudinal axis extends laterally across the vehicle in the manner shown in FIG. 2. It will be understood of course, that the shape of the bracket can include shaped/curved portions as required in order to facilitate the mounting of the valves. Two circular valve mounting holes or apertures 19 and 29 are formed in the main portion 17a of the valve mounting portion 17. One of these holes (i.e. aperture 19) in which a ventilation float valve 2 is disposed, is provided in a forward position with respect to the longitudinal direction of the automotive vehicle. The second of the holes (i.e. hole 20) is provided substantially diagonally across from the mounting hole 19 and supports the ventilation check valve 10 therein.

Figure 7:
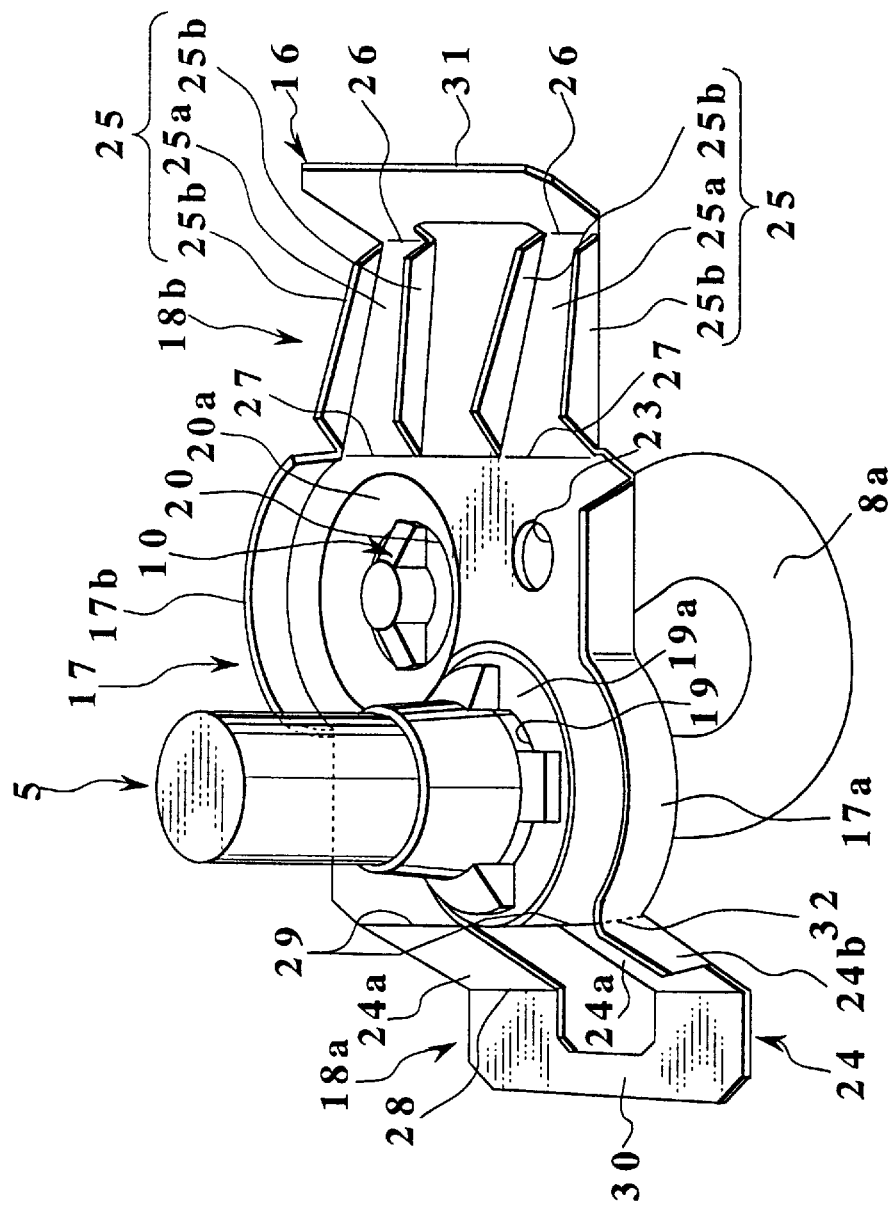
FIG. 7 is a perspective view as of the lower side of the bracket shown in FIG. 6.

A flange portion 19a, which is formed about a peripheral edge of the valve mounting hole 19, extends downward in the manner apparent from FIG. 7, and improves the rigidity with which the ventilation float valve 5 is mounted.

A reinforcing flange portions 17a, 17b which each have a substantially circular arc shape which, in this arrangement, corresponds to the shape of the valve mounting hole 19, are bent downward along the sides of the mounting portion 17 in the manner best seen in FIG. 7. The length of the flange portion 17a is greater than that of flange portion 17b, in the manner shown. This provides one side of the mounting portion 17 with a greater degree of rigidity than the other.

A flange portion 20a extends upward about a peripheral edge of the valve mounting hole 20 to which the ventilation check valve 10 is mounted so as to further improve the rigidity of this mounting position.

The valve mounting portion 17 is so constructed and arranged as to be bendable along a bending line 21 (shown in an alternate long and short dash line in FIG. 2), which bypasses the valve mounting holes 19 and 20 corresponding to the valve mounting positions. Pierced openings 22 and 23 are formed along the bending line 21.

The bending line 21 extends diagonally across a line which connects the centers of the valve mounting holes 19 and 20 of the valve mounting portion 17 so as to establish a predetermined angle a with respect to an input direction of an impact force denoted by the arrow G in FIG. 2.

A bending rigidity of the main portion 17a along the bending line 21 on which the respective valve mounting holes 19 and 20 are formed is set to be lower than the rigidity of the peripheral edge flange portions 19a and 20a so that the main portion along the bending line 21 can be bent prior to distortion of the peripheral edge flange portions 19a and 20a of the valve mounting holes 19 and 20. This rigidity is also higher than the rigidity of the impact absorbing portions 18a and 18b, so that bending along the bending line 21 occurs only after deformation of these impact absorbing portions 18a and 18b.

The impact absorbing portions 18a and 18b, are connected to front and rear side supporting portions 24 and 25 located at front and rear end edges of the valve mounting portion 17 by way of first to fourth bending portions 26 to 29. More specifically, the front and rear side supporting portions 24 and 25 are respectively bent by the first and second bending portions 26 and 27 and the third and fourth bending portions 28 and 29. The first and second bending portions 26 and 27 of the front side supporting portion 24 have a different rigidity so that the first bending portion 26 which is positioned farther than the valve mounting portion 17 firstly starts deformation. Similarly, the third and fourth bending portions 28 and 29 of the rear side supporting portion 28 which is positioned more distal than the valve mounting portion 17 will firstly undergo deformation. Similarly, the third and fourth bending portions 28 and 29 of the rear side supporting portion 25 have a different rigidity so that the third bending portion 28 which is positioned farther than the valve mounting portion 17 firstly starts deformation. Further, the bending portions 26 to 29 are disposed in parallel along the longitudinal direction of the automotive vehicle which corresponds to the impact input direction.

Each of the first to fourth bending portions 26 to 29 is formed by bending the metal plate so as to have the same thickness and to extend in a direction substantially perpendicular to the impact input direction. The metal plates corresponding to the respective bending portions have a different size in a lateral width direction. Accordingly, in the first to fourth bending portions 26 to 29, an area of substantially perpendicular cross section with respect to the impact input direction of each of the bending portions, is different so that the bending rigidity can be varied.

Accordingly, the pair of front side supporting portions 24 and 24 which mount the valve mounting portion 17 to the rear end upper wall corner portion 15a of the tank body 15, are integrally extended in the front end edge of the valve mounting portion 17 through the fourth bending portions 29 and 29.

The fourth bending portions 29 and 29 are formed such that a total area of substantially perpendicular cross section with respect to the impact input direction is the fourth smallest among the bending portions 26 to 29, thereby endowing these members with a fourth ease of deformation.

A welding member 30 is welded and fixed to an inner side surface 15b of an upper wall portion in the tank body 15 at a weld surface 30a (shaded portion in FIG. 2).

Accordingly, if a downward force within the tank body 15 is applied to the valve mounting portion 17, a portion other than the weld portion 30a of the weld member 30 is peeled and the weld member 30 is bent along a peeling line 30b. This line corresponds to a valve rotation bending portion so that the valve mounting portion 17 is rotatably moved downward within the tank 15 around the peeling line 30b. As a result of this, the respective valves disposed in the valve mounting portion 17, become positioned in the space provided within the tank body 15.

The third bending portions 28 and 28 are formed such that a total area of substantially perpendicular cross section with respect to the impact input direction is the third smallest among the bending portions 26 to 29, thereby endowing these members with a third ease of deformation.

The rear end edge of the valve mounting portion 17 is integrally extended with the pair of rear side supporting portions 25 and 25 for mounting the valve mounting portion 17 in the upper wall corner portion 15a of the rear end in the tank body 15 through the second bending portions 27 and 27.

The second bending portions 27 and 27 are formed such that a total area of substantially perpendicular cross section with respect to the impact input direction is the second smallest among the bending portions 26 to 29, thereby endowing these members with a second ease of deformation.

A weld member 31 which is welded and fixed to an inside of the rear wall portion 15c of the tank body 15, extends integrally extended along the front of the rear side supporting portions 25 and 25. The weld member 31 is previously bent downward at a predetermined angle to the rear side supporting portions 25 and 25.

The first bending portions 26 and 26 are formed such that a total area of substantially perpendicular cross section with respect to the impact input direction becomes the smallest among the bending portions 26 to 29, thereby rendering these members the most easy to deform. A flange portion 24b which is bent downward in a direction substantially perpendicular to a main surface portion 24a is integrally formed in a side portion of the front side supporting portion 24.

A flange portion 25b and 25b which is bent downward in a direction substantially perpendicular to a main surface portion 25a is integrally formed in both side portions of the rear side supporting portions 25 and 25.

As shown in FIG. 7, among the front side supporting portions 24, an outside and edge of the front side supporting portion 24 close to the ventilation float valve 5, is provided with a deformation prevention flange portion 32. The deformation prevention flange portion 32 is bent toward a lower surface which corresponds to an opposing side surface to the valve mounting side surface of the valve mounting portion 17.

The deformation prevention flange 32 is provided in such a manner as to integrally connected to the adjacent reinforcing flange 17a and the flange portion 24b.

Figure 6:
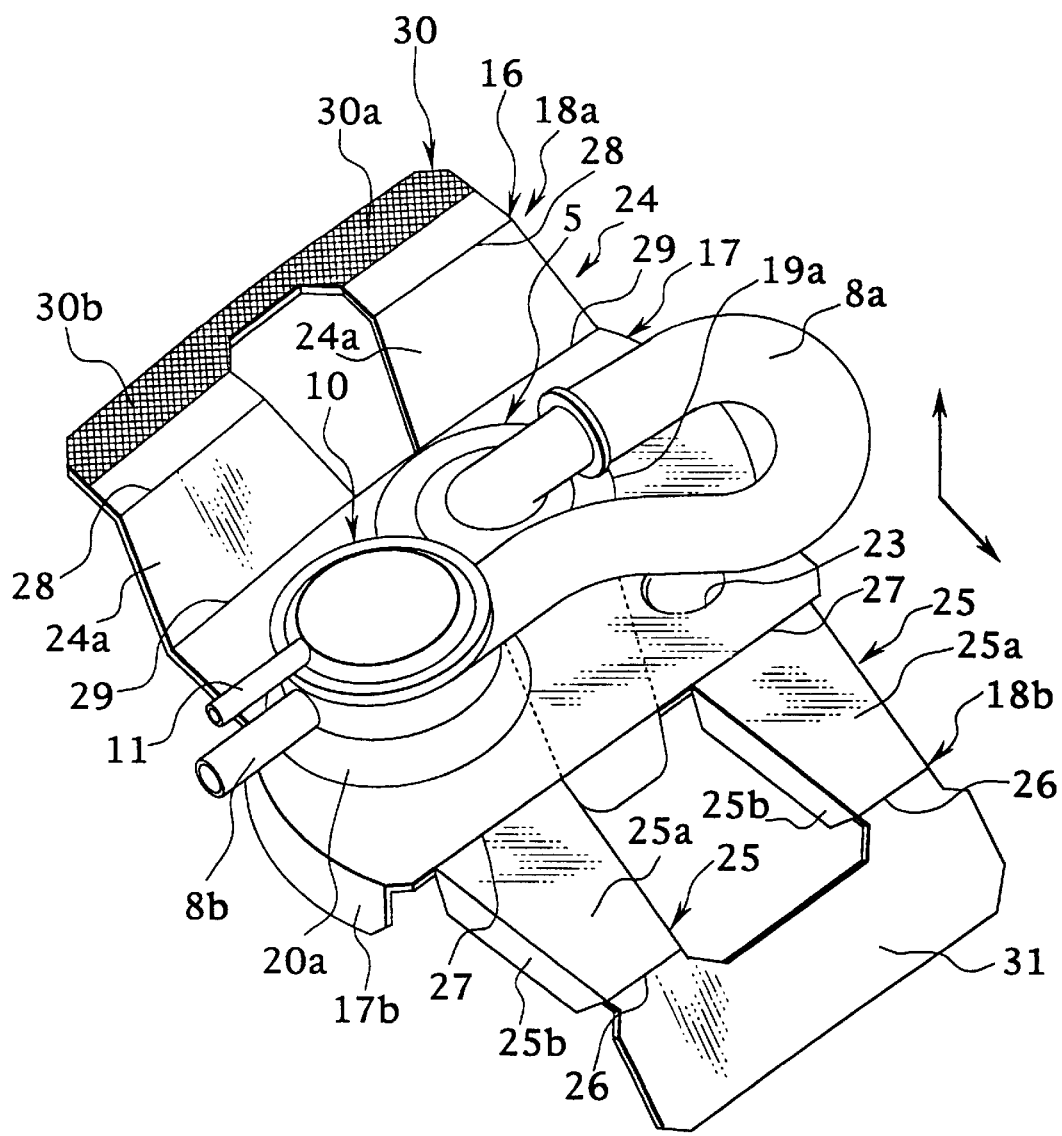
FIG. 6 is a perspective view which shows the manner in which valves are disposed in the bracket used in the fuel tank structure depicted in FIG. 1.

This arrangement is such that the ventilation float valve 5 and the ventilation check valve 10 are respectively inserted into the valve mounting holes 19 and 20 formed on the valve mounting portion 17 of the bracket 16 and these respective valves 5 and 10 are engaged with the respective flange portions 19a and 20a so that the respective valves 5 and 10 are securely mounted on the bracket 16. As shown in FIG. 6, an inlet flow tube 8a connects the respective valves 5 and 10.

The weld portion 30a of the weld member 30 and the weld member 31 are respectively welded and fixed to the inside 15b of the upper wall portion of the upper wall corner portion 15a of the rear end in the tank body 15 and to the inside 15c of the rear wall portion of the upper wall corner portion 15a of the rear end in the tank body 15, by spot welding or the like.

Each end of an inlet flow tube 8b and a signal tube 11 is connected to the ventilation check valve 10.

In the case that an impact force in the longitudinal direction of the automotive vehicle is received by the tank body 15 in a state in which the respective valves 5 and 10 are fixed to the inside of the tank body 15, the tank 15 first deforms in the manner illustrated in FIG. 1 so as to absorb the impact force. Following this, the impact absorbing portion 18 of the bracket 16 deforms so as to absorb the impact.

This impact absorbing event may preferably take place in two stages. First, the rear supporting portion 25 may be deflected counter-clockwise (as seen in FIG. 1) with first and second bending portions 26, 27 being bent and, subsequently, impact energy is further absorbed or dissipated with the front supporting portion 24 being deflected or folded about its line of connection 30b with the internal surface of the fuel tank. The generally parallel orientation of the rear supporting portion 25 with respect to the impact load direction will allow an impact load associated with an intrusion of the tank wall into the interior of the tank without causing any damage to the valves 5, 10. Moreover, a generally vertical arrangement of orientation of the front side supporting portion will deflect or tilt the valve supporting portion about the connection line 30b, thereby providing an additional clearance of the valves 5, 10 with respect to wall intrusion. This deflecting movement of the front supporting portion however, will be more readily realized by the deformation preventing flange portion 32 described earlier.

Accordingly, the impact force at a time of collision of the automotive vehicle not directly applied to the respective valves 5 and 10 so that deformation is restricted, thereby preventing the deterioration of the valves 5 and 10. Further, since the respective valves 5 and 10 are mounted within the tank body 15, there is no portion to be fastened and fixed to the exterior of the tank body 15 using nuts and bolts. Accordingly, since the respective valves 5 and 10 and the bracket 16 are never exposed to the open air and the deformation is restricted, the formation of rust is essentially prevented.

Still further, the first to fourth bending portions 26 to 29 each having a different rigidity, they are deformed in order of the first bending portion 26, the second bending portion 27, the third bending portion 28 and the fourth bending portion 29 while absorbing the impact force.

The fourth bending portion 29 is deformed after the impact force is mostly absorbed by the deformation of the first to third bending portions 26 to 28 so that the deformation quantity of the fourth bending portion 29 is small, thereby maximizing damage prevention due to the interference.

Further, since the respective first to fourth bending portions 26 to 29 are structured such that the bending rigidity thereof is different by using different cross sectional areas (due to different lateral width size), the bracket 16 can be easily formed from sheet metal or the like.

Still further, since the front and rear side supporting portions 24 and 25 which connect these first to fourth bending portions 26 to 29 are provided with a high rigidity though the use of the flange portions 24b and 25b, and the deformation prevention flange portion 32, they are not easily deformed.

Accordingly, the shape of the deformed bracket 16 can be formed a substantially recess shaped side surface having a bottom portion by the valve mounting portion 17. After the bracket 16 is deformed, a space can be secured in the upper side corner portion 15a of the rear end within the tank body 15 so as to assuredly prevent that the respective valves 5 and 10, which are mounted in the upper surface side of the valve mounting portion 17, from interfering with other parts.

Furthermore, since the rear side supporting portions 25 and 25 are structured to have the flange portion 25b bent in a substantially perpendicular direction to the main surface portion 25a, the rear side supporting portion 25 has a high rigidity and can be easily formed from a sheet of plate member by a press forming and the like.

Further, the weld member 30 is peeled along the peeling line 30b at a substantially half degree by an input of the impact force and bent, and the valve mounting portion 17 is rotated downward within the tank body 15 in a direction shown in an arrow of FIG. 1 around the peeling line 30b.

Accordingly, the shape of the deformed bracket 16 becomes a substantially recess shaped side surface having the bottom portion of the valve mounting portion 17 formed by bending of the first and second bending portions 26 and 27. Thereby, space can be secured in the upper portion within the tank body 15 including the upper side corner portion 15a of the rear end, so that the respective valves 5 and 10 disposed in the valve mounting portion 17 can be securely positioned within the space.

As a result of this, if the valve mounting side surface of the valve mounting portion 17 is set to the upper surface side, the risk that the valves 5 and 10 interfere with other parts such as the rear side supporting portion and the like, is reduced.

Still further, since the deformation prevention flange portion 32 is bent toward the downward direction which corresponds to the opposite side surface to the valve mounting side surface of the valve mounting portion 17 at the fourth bending portion 29, the front side supporting portion 24 is hardly bent toward the valve mounting portion 17 due to this deformation prevention flange portion 32.

Accordingly, the bending and deformation quantity by the input of the impact force at the fourth bending portion 29 is assuredly restricted so as not to become larger than a predetermined amount, thereby preventing close contact with other parts such as the front side supporting portions 24 and 24 and the like, and so that the respective valves 5 and 10 do not interfere with other parts. Therefore, the respective valves 5 and 10 can be further maintained in an operative state.

Then, since the deformation prevention flange portion 32 is provided in such a manner as to be connected to the adjacent reinforcing flange portion 17b and the flange portion 24b, the deformation prevention flange portion 32 can be formed by press forming at the same time of forming the reinforcing flange portion 17b and the flange portion 24b so that the formation thereof is simplified.

Furthermore, since the flange portions 19a and 20a and the reinforcing flange portions 17a and 17b are formed in the peripheral edge of the valve mounting holes 19 and 20 among the main portion 17a of the valve mounting portion 17 formed as a plain plate shape, the peripheral edge of the valve mounting position has a further improved rigidity so that the portion is barely deformed.

Then, since the piercing opening 22 is provided on the bending line 21 for bending with bypassing the valve mounting position of the valve mounting portion 17, in the case that the impact force is transmitted to the valve mounting portion 17 without being absorbed by the impact absorbing portion 18, bending deformation along the bending line 21 occurs enabling the impact force to be absorbed.

In this case, since the bending line 21 is provided on the diagonal line of the valve mounting portion 17 and is formed at a constant angle $\alpha$ with respect to the impact input direction, the valves 5 and 10 do not interfere with each other during bending.

Further, the valves can be disposed in an asymmetrical position with respect to the diagonal line (the bending line 21) so as to have a good space efficiency. Accordingly, the interference can be prevented without increasing the area of the valve mounting portion 17.

Still further, the main portion 17a of the valve mounting portion 17 is formed to have a predetermined rigidity so that the bending line 21 is deformed further after the deformation of the fourth bending portion 29 which corresponds to the final deformation portion of the impact absorbing portion 18, most of the impact is absorbed by the deformation of the first bending portion 26 to the fourth bending portion 29 of the impact absorbing portion 18 and thereafter the remaining impact force affecting to the valve mounting portion 17 is absorbed by the bending deformation of the bending line 21.

Accordingly, the impact force at a time of collision of the automotive vehicle is not directly applied to the valves 5 and 10 and the deformation in the valve mounting portion is restricted, thereby improving the anticorrosive performance.

As mentioned above, the embodiment in accordance with the present invention has been in detail explained with reference to the accompanying drawings, however, the invention is not limited to this single embodiment and various modifications and variations may be made without departing from the scope of the invention which is limited only by the appended claims.

For example, in the above embodiment, the ventilation float valve 5 and the ventilation check valve 10 are disposed in the valve mounting portion 17, however, the structure is not limited to this arrangement and the evaporation check valve, fuel feed pump or fuel level gauge may be also be disposed in the valve mounting portion 17. Further, the shape, the number and the function of the valve are not limited so that various kinds of valves may be disposed in the valve mounting portion 17.

What is claimed is:

1. A fuel tank structure comprising:
    a tank body;
    a flow control valve;
    a bracket which includes:
        a connecting portion connected to an inside of said tank body,
        a valve mounting portion to which said flow control valve is mounted, and
        an impact absorbing portion which is disposed between said connecting portion and said valve mounting portion and is deformed by itself so as to absorb the impact when said tank body is deformed by an impact.

2. A fuel tank structure as recited in claim 1, wherein: said impact absorbing portion includes a plurality of bent portions which are aligned in a predetermined direction and which respectively extend in a direction which crosses the predetermined direction; and wherein said impact absorbing portion includes a plurality of bent portions which are aligned in the predetermined direction and respectively extend across the predetermined direction, and wherein said plurality of bent portions are so constructed and arranged so that their rigidity reduces with distance from the valve mounting portion.

3. A fuel tank structure as recited in claim 2, wherein said bent portions are formed such as to respectively extend in a second direction which is substantially perpendicular to the predetermined direction and to have a cross-sectional area which reduces with distance from the valve mounting portion, and wherein said bracket has a supporting portion which connects said bent portions.

4. A fuel tank structure as recited in claim 3, wherein said supporting portion includes a main surface portion which connects said bent portions and a flange portion which projects substantially perpendicularly to said main surface portion.

5. A fuel tank structure as recited in claim 4, wherein said bracket includes a deformation prevention flange portion which successively connects the flange portion of said supporting portion and projects in a direction which crosses an extending direction of said bent portion from a position of said bent portion close to the valve mounting portion.

6. A fuel tank structure as recited in claim 2, wherein said valve mounting portion includes a main portion which is formed as a substantially plain plate and has a reinforcing flange portion which projects from a peripheral edge of said main portion.

7. A fuel tank structure as recited in claim 6, wherein said bracket includes a deformation prevention flange portion which successively connects the reinforcing flange portion of said valve mounting portion and projects in a direction which crosses an extending direction of said bent portion from a position of said bent portion close to the valve mounting portion.

8. A fuel tank structure as recited in claim 2, wherein said bracket includes a deformation prevention flange portion which projects in a direction which crosses an extending direction of said bent portion from a position of said bent portion close to the valve mounting portion.

9. A fuel tank structure as recited in claim 1, wherein said bracket is disposed in an upper portion within said tank body, wherein said impact absorbing portion includes a bent portion which is bent so that said valve mounting portion moves downward within said tank body at a time of receiving an impact, and wherein said valve mounted to said valve mounting portion moves into a space formed after the deformation of said tank body within the tank body at a time of receiving said impact.

10. A fuel tank structure as recited in claim 1, wherein said valve mounting portion includes a main portion which is formed as a substantially plain plate and a bendable portion provided in said main portion such that said main portion bends along a bending line which is non-intersective with a position in which said valve is mounted, in response to a predetermined impact.

11. A fuel tank structure as recited in claim 10, wherein said bendable portion of the valve mounting portion include an opening formed on the bending line.

12. A fuel tank structure as recited in claim 10, wherein said bending line of the valve mounting portion is set to have a linear shape obliquely crossing the predetermined direction and wherein the main portion of said valve mounting portion includes two valve mounting portions disposed in an asymmetrical relation with respect to said bending line.

13. A fuel tank structure as recited in claim 10, wherein said bendable portion of the valve mounting portion has a rigidity in which said main portion is bent along the bending line after the final deformation of said impact absorbing portion.

14. A fuel tank structure for absorbing an external impact load applied to a fuel tank, comprising:
a tank body having a wall subject to the impact load and an internal surface defining an interior volume;
a fuel control valve housed within the interior of the tank;
a bracket disposed within the fuel tank and having
a valve mounting portion for mounting the valve thereon, and
a pair of supporting portions, each being connected at one end to the internal surface of the wall and at the other end connected to the valve mounting portion wherein each supporting portion defines bendable lines at its connecting portions with the valve mounting portion and the internal surface.

15. A fuel tank structure as recited in claim 14, wherein the valve mounting portions extends substantially parallel with the direction in which the external force is loaded, and wherein a first supporting portion is disposed adjacent an area whereat impact load is input, and extends upwardly with respect to the valve mounting portion so that, upon application of the impact load, the first support portion is arranged to be deflected without causing the impact associated intruded wall to come into contact with the valve mounted on the valve mounting portion.

16. A fuel tank structure as recited in claim 14, wherein the valve mounting portion is generally a rectangular plainer plate and having a bendable line about which the valve mounting portion is bent when the impact load is applied to the fuel tank.

17. A fuel tank structure as recited in claim 16, wherein the valve mounting portion has a plurality of holes for receiving a corresponding plurality of valves, and wherein the valves received in the holes are arranged asymmetrically with respect to the bendable line so that, when the valve mounting portion is bent, the valves are free from interference with each other.

18. A fuel tank structure as recited in claim 16, wherein the bending rigidity about the bendable line of the valve mounting portion is set in such a way that it bends after deflections of first and second support portions have taken place.

19. A fuel tank structure as recited in claim 15, wherein a second supporting portion is disposed remote from the impact load input and extends generally perpendicular to the valve mounting portion in order for the bracket to form a generally L-shaped configuration so that, upon impact load, the second support portion is deflected about a connecting line defined between the second supporting portion and the internal surface.

20. A fuel tank structure as recited in claim 19, wherein the bending rigidity accorded on the opposite ends of the first supporting portion are set smaller than those for the second support portion such that the deflection about the first support portion occurs prior to that about the second supporting portion.

* * * * *